United States Patent
Berard et al.

(10) Patent No.: US 7,340,107 B2
(45) Date of Patent: Mar. 4, 2008

(54) SHADOW-FREE 3D AND 2D MEASUREMENT SYSTEM AND METHOD

(75) Inventors: Louis Berard, Sainte-Catherine-de-la-Jacques-C (CA); Michel Cantin, St-Lambert (CA); Alexandre Nikitine, Montréal (CA)

(73) Assignee: Sol Vision Inc., Boucherville, Quebec (CA)

( * ) Notice: Subject to any disclaimer, the term of this patent is extended or adjusted under 35 U.S.C. 154(b) by 648 days.

(21) Appl. No.: 10/656,700

(22) Filed: Sep. 4, 2003

(65) Prior Publication Data

US 2004/0047517 A1 Mar. 11, 2004

Related U.S. Application Data

(60) Provisional application No. 60/407,969, filed on Sep. 5, 2002.

(51) Int. Cl.
*G06K 9/40* (2006.01)
*G06K 9/20* (2006.01)
*G01B 9/02* (2006.01)

(52) U.S. Cl. ........................ 382/274; 356/450; 382/312

(58) Field of Classification Search ................ 382/145, 382/147, 154, 274, 285, 312; 356/237.4, 356/450, 601–613
See application file for complete search history.

(56) References Cited

U.S. PATENT DOCUMENTS

| | | | |
|---|---|---|---|
| 4,564,295 A | | 1/1986 | Halioua |
| 4,646,214 A | * | 2/1987 | Mendleski ................ 362/294 |
| 5,307,152 A | * | 4/1994 | Boehnlein et al. .......... 356/605 |
| 5,612,786 A | * | 3/1997 | Huber et al. ............... 356/604 |
| 5,877,507 A | * | 3/1999 | Shinomiya ............... 250/559.4 |
| 6,040,910 A | * | 3/2000 | Wu et al. .................. 356/613 |
| 6,552,783 B1 | * | 4/2003 | Schmidt et al. .......... 356/237.4 |
| 6,724,489 B2 | * | 4/2004 | Freifeld ..................... 356/601 |
| 6,841,780 B2 | * | 1/2005 | Cofer et al. ............. 250/341.1 |

* cited by examiner

*Primary Examiner*—Kanjibhai Patel
(74) *Attorney, Agent, or Firm*—Bereskin and Parr

(57) ABSTRACT

A shadow-free 3D and 2D measurement system combining, in one FMI set-up, a Moiré 3D lighting with other simultaneous external illuminations (for example a coaxial one or another). The reconstructed image combines the advantages of these different illuminations. The relative light intensities are selected in order to assure the best 2D detection while maintaining the 3D measurements.

8 Claims, 2 Drawing Sheets

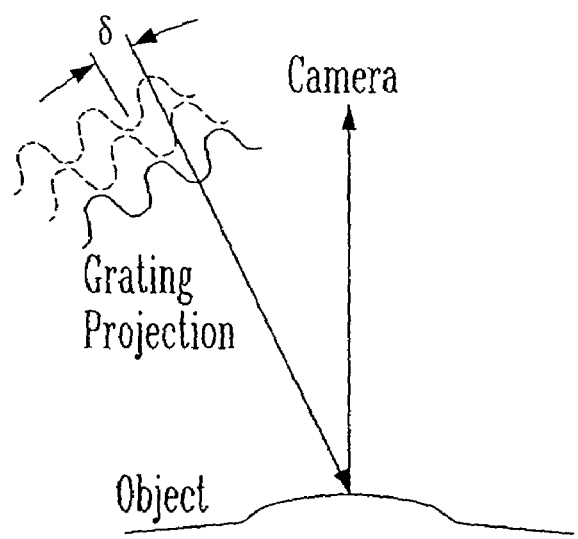
FIG. 1 *(PRIOR ART)*
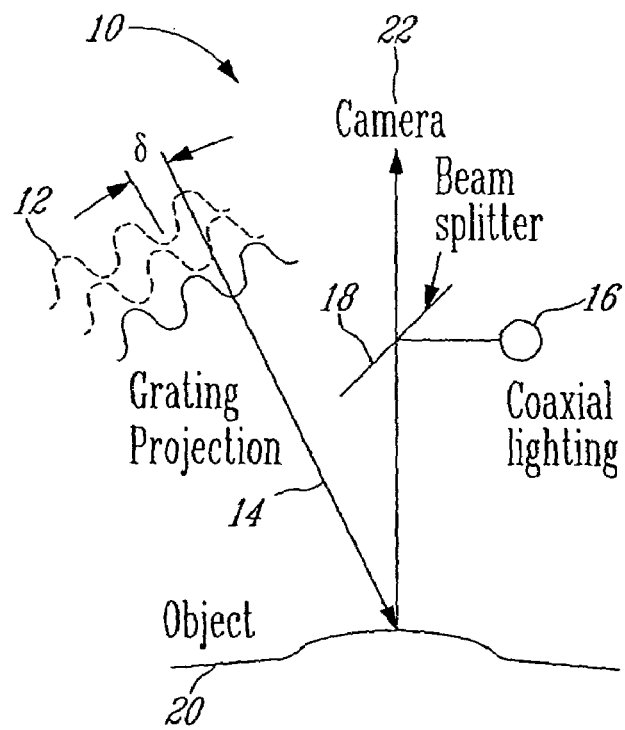
FIG. 2

SHADOW-FREE 3D AND 2D MEASUREMENT SYSTEM AND METHOD

This application is related to and claims priority to Ser. No. 60/407,969, filed 5 Sep., 2002, entitled "SHADOW-FREE 3D AND 2D MEASUREMENT SYSTEM AND METHOD", which application is specifically incorporated by reference herein.

FIELD OF THE INVENTION

The present invention relates to non-invasive measurement systems. More specifically, the present invention is concerned with a shadow-free 3D and 2D measurement system and method.

BACKGROUND OF THE INVENTION

In most automated 3D vision inspection systems, 3D measurements are combined with a 2D analysis, which in many cases implies the use of two separate acquisition stations. Consequently, it is difficult to take advantage of preliminary 2D results to improve the 3D analysis.

The well-known Fast Moiré Interferometry (FMI) method is based on a combination of structured light projection and phase-shift method for 3D information extraction at each point in an image. The FIG. 1 presents an example of FMI system. The FMI method uses the acquisition and analysis of several images with different grating projection. The 3D information extraction is based on an evaluation of intensity variation of each point with structured light modification. Basically, the FMI method analyses a point intensity variation with projected grating modification. The FMI method involves acquiring of a plurality of images and allows reconstructing an additional image corresponding to a configuration of lighting without any grid. Such a reconstructed image is useful for subsequent 2D analysis. However, this reconstructed image corresponds to a given configuration with lighting under an angle and does not give the possibility to identify some particularities of inspected components, since in such configuration, some elements thereof may be barely or even not visible, resulting in a less detailed and slower acquisition.

The U.S. Pat. No. 5,646,733 presents a non-invasive measuring method and system based on a Shadow Moiré configuration wherein the object under inspection is moved relative to an optical head, in such a way that multiple images with different phases are obtained.

Other approaches allow acquiring consecutive images with different illuminations by turning on each one of a number of illumination sources successively. However, since such a method requires light sources commutation, additional images acquisition results in an increase of inspection duration.

There is a need in the art for a 3D and 2D measurement system and method allowing a detailed thorough and fast examination of an object.

OBJECTS OF THE INVENTION

An object of the present invention is therefore to provide an improved shadow-free 3D and 2D measurement system and method.

SUMMARY OF THE INVENTION

More specifically, in accordance with the present invention, there is provided a system for shadow-free 3D and 2D measurements of an object, comprising an image acquisition unit, an FMI set-up with a first lighting, and at least one constant second lighting, wherein the system comprises a single grid located in an axis of projection.

In accordance with the present invention, there is further provided a system for shadow-free 3D and 2D measurements of an object combining in a single FMI set-up a Moiré 3D lighting with at least one simultaneous external constant illumination to obtain a reconstructed image comprising features located in shadow zones created by the Moiré 3D lighting, wherein relative intensities of the Moiré 3D lighting and of the at least one external illumination respectively are selected to allow a 2D detection and 3D measurements.

In accordance with the present invention, there is further provided a method for shadow-free 3D and 2D measurements of an object, comprising the acts of providing a first lighting source illuminating the object at an angle through a single grid located in an axis of projection; providing at least one second external constant lighting source illuminating the object; acquiring at least 3 phase-shifted images with an image-acquisition unit; obtaining a reconstructed image taking into account both the first lighting source and the at least one second external constant lighting source; and analyzing the reconstructed image.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 1, which is labeled "PRIOR ART", is a schematic view of a FMI system as used in the art;

FIG. 2 is a schematic side elevational view of a system according to an embodiment of the present invention.

DESCRIPTION OF EMBODIMENTS OF THE INVENTION

Figure 3:
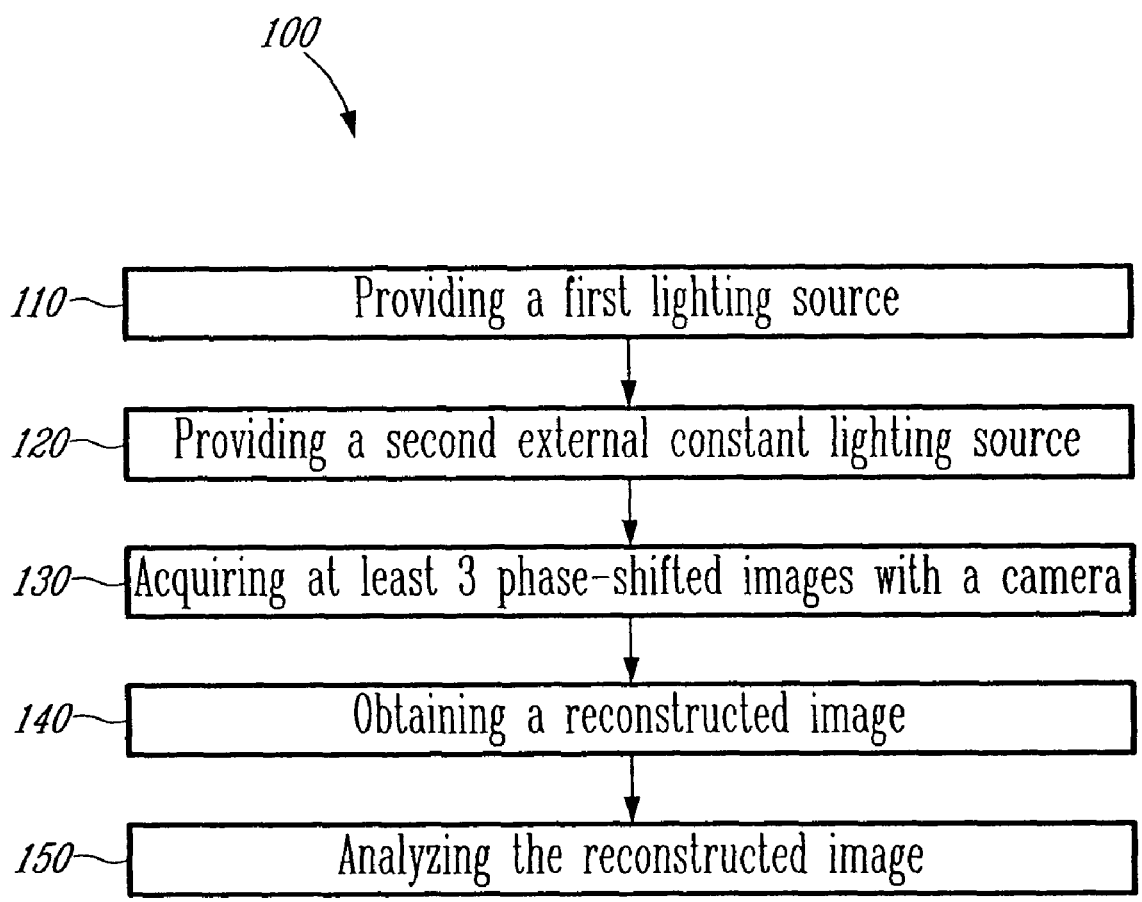
FIG. 3 is a flowchart of a method according to an embodiment of the second aspect of the present invention.

The present invention generally provides a system and a method allowing a thorough inspection of an object.

More precisely, the system of the present invention combines in a single FMI set-up a Moiré 3D lighting with other simultaneous external illumination, such as for example a coaxial external illumination, in such a way that the reconstructed image combines the advantages of these different illuminations. The relative light intensities may be chosen in order to assure the best 2D detection while maintaining the 3D measurements.

The present invention will be described in relation to an example of 4 phase-shifted images, but may be applied to a range of systems of multiple phase-shifted images.

As is well known in the art, in the FMI method, the 3D analysis is based on the variation of a grid projected on an inspected object. In a particular case of four phase-shifted images, the following system of equations is used:

$$\begin{cases} I_a(x, y) = R(x, y) \cdot [1 + M(x, y) \cdot \cos(\varphi(x, y))] \\ I_b(x, y) = R(x, y) \cdot [1 + M(x, y) \cdot \cos(\varphi(x, y) + \pi/2)] \\ I_c(x, y) = R(x, y) \cdot [1 + M(x, y) \cdot \cos(\varphi(x, y) + \pi)] \\ I_d(x, y) = R(x, y) \cdot [1 + M(x, y) \cdot \cos(\varphi(x, y) + 3\pi/2)] \end{cases} \quad (1)$$

where I(x,y) is a scattered light intensity at a target coordinates {x,y}, R(x,y) is proportional to the target reflectance and incident light source intensity, and M(x,y) is a fringe pattern modulation (also called the pattern contrast).

By resolving this system of equations (1), the phase (p may be founded as follow:

$$tg\varphi(x, y) = \frac{I_d(x, y) - I_b(x, y)}{I_a(x, y) - I_c(x, y)} \quad (2)$$

It appears that the phase is independent from the target reflectance. This phase value is linked to object height information.

When using an additional 2D lighting (coaxial or another), the relation (1) becomes:

$$\begin{cases} I_a(x, y) = I_{external}(x, y) + R(x, y) \cdot [1 + M(x, y) \cdot \cos(\varphi(x, y))] \\ I_b(x, y) = I_{external}(x, y) + R(x, y) \cdot [1 + M(x, y) \cdot \cos(\varphi(x, y) + \pi/2)] \\ I_c(x, y) = I_{external}(x, y) + R(x, y) \cdot [1 + M(x, y) \cdot \cos(\varphi(x, y) + \pi)] \\ I_d(x, y) = I_{external}(x, y) + R(x, y) \cdot [1 + M(x, y) \cdot \cos(\varphi(x, y) + 3\pi/2)] \end{cases} \quad (3)$$

where $I_{external}(x,y)$ is proportional to the external light intensity (which is constant during the entire time of acquisition of the four images), for example coaxial or another light source.

By resolving the above system of equations (3), the phase is given by the relation (2) hereinabove, which indicates that the phase value, and therefore a measured height of the object under inspection, is independent from both the target reflectance $R(x, y)$ and the external lighting $I_{external}(x,y)$.

Therefore, the system of the present invention, as illustrated in the embodiment of FIG. 2, comprises an FMI set-up with a Moiré 3D lighting 12 and a grid projection 14, and a constant coaxial lighting 16, produced by a beam splitter 18 located between an inspected object 20 and an image acquisition unit such as a camera 22, is selected as an example of an external illumination.

Both lightings (grid projection and coaxial) remain switched on during the entire acquisition time. The coaxial invariable light 16 does not affect the phase evaluation. Saturation may be easily avoided by an appropriate choice of ratio between the lighting intensities and grid contrast.

The constant external lighting 16 may be an ambient light, a ring source, a combination thereof, or any other invariable light source selected according to specific needs.

By using the following relation to obtain a reconstructed image:

$$\frac{I_a(x, y) + I_b(x, y) + I_c(x, y) + I_d(x, y)}{4} = R(x, y) + I_{external}(x, y) \quad (4)$$

such a system 10 allows taking benefit from different illuminations in the same image while avoiding the need to acquire additional images, since the reconstructed image takes into account simultaneously the Moiré slanted lighting 12 and the additional external coaxial lighting 16.

Interestingly, adding the coaxial (or another) lighting 16 allows inspection of regions that are in shadow zones created by the Moiré slanted lighting (lighting under an angle). The analysis of such image (4) yields a detailed shadow-free inspection of the object. Indeed, while a number of features of the object under inspection may be seen under the slanted illumination, this slanted illumination nonetheless creates shadow regions, which hide some other features of the object under inspection. The additional coaxial illumination allows acquisition of date in these shadow regions and thereby brings up these other features of the object under inspection.

Therefore, this combined reconstructed image permits the simultaneous analysis of different object features without neither commutation of light sources nor acquisition of additional images. It is believed to be within the reach of a person skilled in the art to select an appropriate light intensity combination for the best detection of object features.

It is to be noted that the system 10 does not require a grid between the image acquisition unit 22 and the object 20. Indeed, as people in the art will appreciate, the system 10 has generally a configuration of the known Projected Moiré type, which, contrary to the known Shadow Moiré configuration, does not require the grid to be placed very close to the object, but, contrary to such a conventional system, the system 10 uses a single grid 14 located in the axis of the projection. Thus, the system 10 proves to be simpler to assemble and adjust than known systems.

Moreover, the absence of a grid between the image acquisition unit and the object allows using the same image-acquisition unit with light sources that may be changed in order to proceed to other type of measurements. For example, the same system 10 with a single image acquisition unit may be used to perform surface inspections of an object for yielding a two-dimensional analysis, which may be complementary to a three-dimensional analysis, and a three dimensional-analysis with the projected grid.

FIG. 3 is a flowchart of a method according to an embodiment of the second aspect of the present invention, for shadow-free 3D and 2D measurements of an object.

The method 100 generally comprises providing a first lighting source illuminating an object under inspection at an angle, through a single grid located in the axis of the projection (act 110); providing a second external constant lighting source illuminating the inspected object (act 120); acquiring at least 3 phase-shifted images with an image acquisition unit (act 130); obtaining a reconstructed image taking into account both the first lighting source and the second external constant lighting source (act 140); and analyzing the reconstructed image (act 150).

For a two-dimensional analysis of the object, a single image acquisition unit may be used to perform successive surface inspections with a 2D light source such as a coaxial lighting as described hereinabove in relation to the system according to the present invention.

For a three-dimensional analysis of the object, a Moiré 3D lighting and a grid projection are introduced, as described hereinabove in relation to the system according to the present invention.

Therefore, the system and method of the present invention allow a 3D analysis based on a variation of the grid projected on the inspected object, wherein an additional image with a 2D lighting simplifies the analysis of some object particularities.

Although the present invention has been described hereinabove by way of embodiments thereof, it can be modified, without departing from the spirit and nature of the subject invention as defined in the appended claims.

What is claimed is:

1. A system for shadow-free 3D and 2D measurements of an object, comprising:
    a Fast Moire Interferometry set-up with a first lighting source for illumination the object at an angle through a single grid located in an axis of projection;
    at least one constant second lighting; and
    an image acquisition unit for acquiring at least 3 phase-shifted images, and for obtaining a reconstructed image comprising features located in shadow zones created by the Fast Moire Interferometry set-up.

2. The system according to claim 1, wherein said system allows taking benefit from said first and said at least one second lighting in a reconstructed image combining features of the object, the object being visible under said constant second lighting while in shadow regions created by said first lighting.

3. The system according to claim 1, wherein said at least one constant second lighting is a 2D lighting produced between the object and the image acquisition unit and said first lighting is a Moiré slanted lighting.

4. The system according to anyone of claim 1, wherein said first lighting and said constant second lighting remain switched on during an entire acquisition time of the object.

5. The system according to anyone of claim 1, wherein said at least one constant second lighting is selected in the group comprising an ambient light, a ring light, a constant coaxial lighting, and a combination thereof.

6. The system according to claim 1, wherein said first lighting and said at least one constant second lighting are used successively to perform successive surface inspections of the object.

7. A system for shadow-free 3D and 2D measurements of an object combining in a single Fast Moiré Interferometry set-up a Moiré 3D lighting with at least one simultaneous external constant illumination to obtain a reconstructed image comprising features located in shadow zones created by said Moiré 3D lighting, wherein relative intensities of said Moiré 3D lighting and of said at least one external illumination respectively are selected to allow a 2D detection and 3D measurements.

8. A method for shadow-free 3D and 2D measurements of an object, comprising the acts of:
    providing a first lighting source illuminating the object at an angle through a single grid located in an axis of projection;
    providing at least one second external constant lighting source illuminating the object;
    acquiring at least 3 phase-shifted images with an image-acquisition unit;
    obtaining a reconstructed image taking into account both the first lighting source and the at least one second external constant lighting source; and
    analyzing the reconstructed image.

* * * * *